Dec. 3, 1957 B. G. OLVING 2,815,098
PULSATING POWER BRAKE SYSTEM
Filed May 25, 1954 2 Sheets-Sheet 1
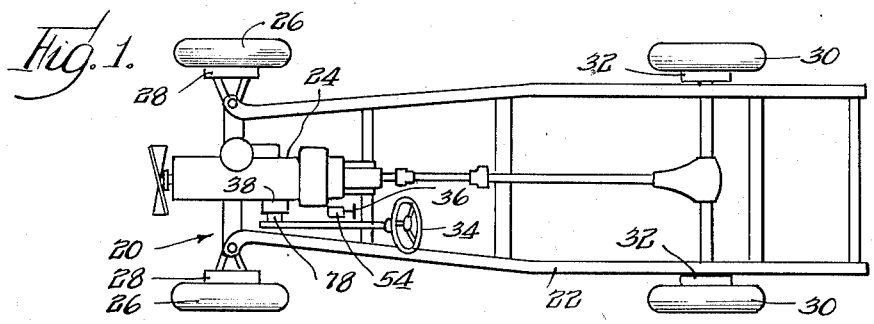
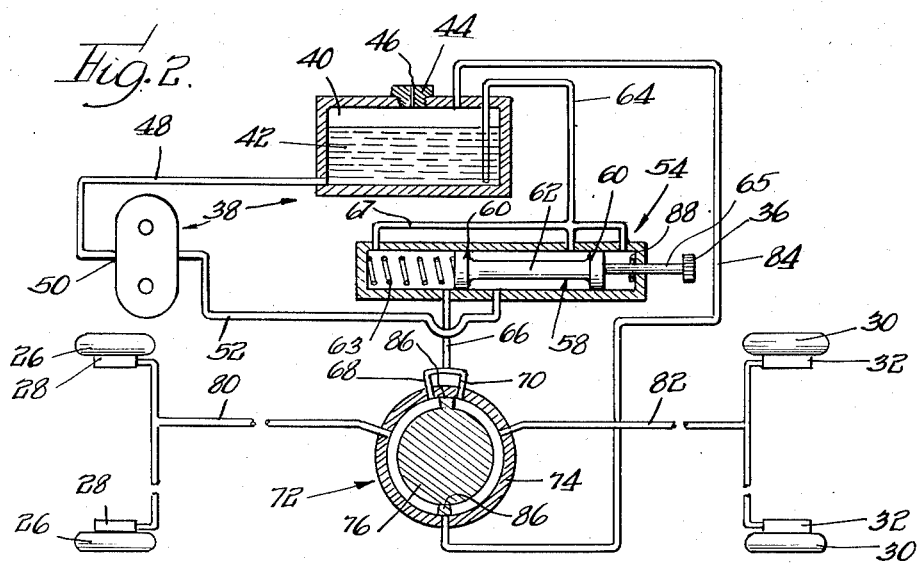
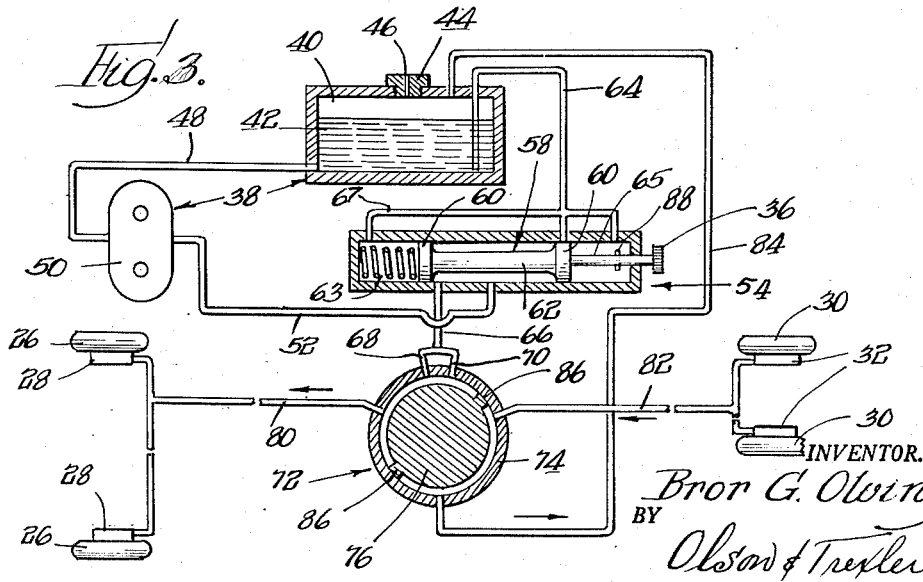
INVENTOR.
Bror G. Olving
BY
Olson & Trexler
attys Dec. 3, 1957 B. G. OLVING 2,815,098
PULSATING POWER BRAKE SYSTEM
Filed May 25, 1954 2 Sheets-Sheet 2
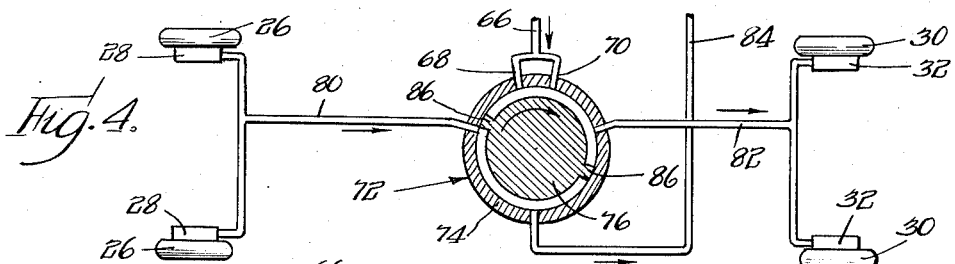
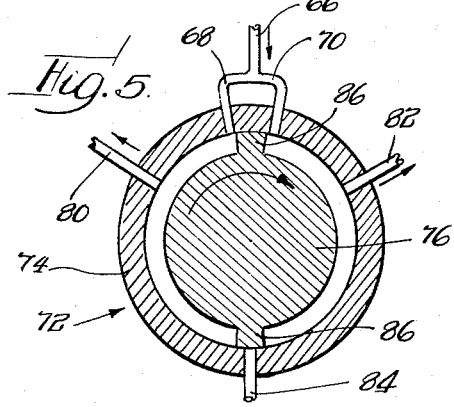
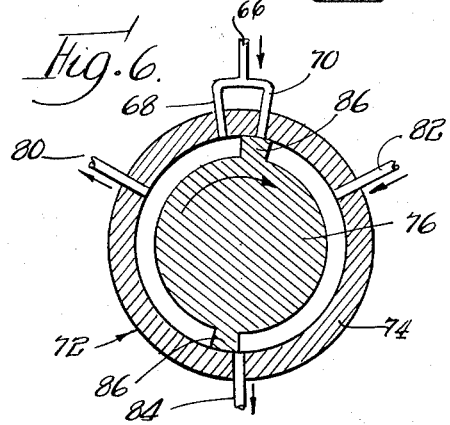
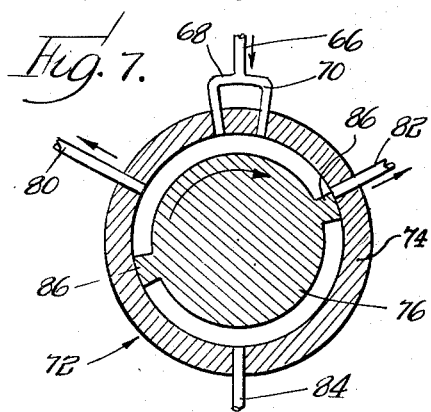
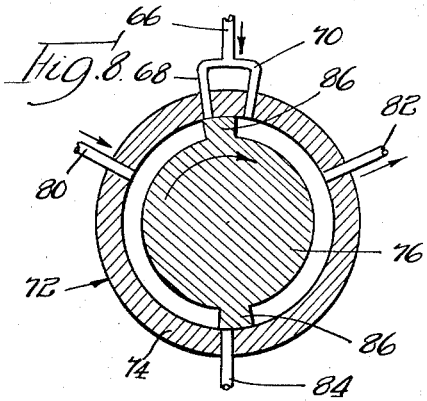
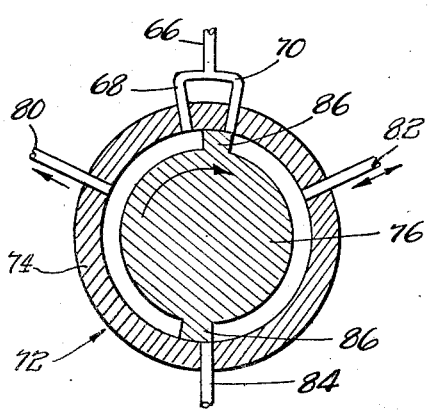
INVENTOR.
Bror G. Olving
BY
Olson & Trexler
attys United States Patent Office 2,815,098
Patented Dec. 3, 1957

2,815,098

PULSATING POWER BRAKE SYSTEM

Bror G. Olving, Elgin, Ill.

Application May 25, 1954, Serial No. 432,102

8 Claims. (Cl. 188—85)

This invention is concerned generally with a braking system, and more particularly with a safety braking system designed to prevent skidding on slippery pavements and the like.

It is well known to the majority of automotive vehicle drivers that when a road surface is slippery due to wet, icy, or snow-covered pavement, a vehicle has a decided tendency to skid and to get out of the driver's control when the brakes are applied, particularly if it is necessary to stop as quickly as possible.

Under normal driving conditions on dry pavement, there is considerable friction between the pavement and the treads of rubber tires such as commonly are used on passenger automobiles and other automotive vehicles. Accordingly, considerable braking torque can be applied between the brake shoes and brake drums of the wheels without having the braking torque become as great as the torque exerted by the pavement on the tires. However, under slippery driving conditions when the pavement is wet, icy, or snow-covered, the sliding friction between the pavement and the tires is greatly reduced. In fact, it often is reduced to such an extent that any except the lightest touch on the brake pedal causes the braking torque to overcome the torque imposed on the wheels by the pavement. Accordingly, the brakes readily lock the wheels against rotation, and the automobile or other vehicle goes into a skid which may not be controllable.

Experienced drivers have found that periodically applying and releasing the brakes by pumping up and down on the brake pedal prevents the brakes from locking the wheels against rotation. Each time the brakes are wholly or partially released by this method, a new surface of the tire periphery is brought into contact with the roadway and the slippery film formed between a sliding tire and a roadway does not have time to form. Accordingly, a much greater braking torque can be applied without causing locking of the wheels and resulting skidding. However, such pumping of the brakes, except for the most experienced drivers, requires a concentrated and conscious mental effort. Many drivers are not aware of the improved braking results to be obtained under slippery driving conditions by pumping the brakes, and yield to the natural tendency to lock the brakes, thus leading to dangerous and often fatal skids. Even drivers who are aware of the benefits derived from braking a vehicle intermittently generally have to act consciously to overcome the natural tendency to lock the brakes.

In the system of braking outlined above all of the brakes of the vehicle act in unison, being on at one time, and off at another time. This may be considered a disadvantage as there are times when no brake is acting to slow the vehicle. Accordingly, following such periods, the braking action consists of short, suddenly applied braking forces. It will be apparent that the suddenly applied forces tend more to overcome the friction between the pavement and the tire than would be equal braking force gradually applied.

It is an object of this invention to provide an anti-skid vehicle brake system for intermittently applying brakes in response to a steady pressure on the brake pedal.

It is a further object of this invention to provide an anti-skid braking system wherein the brakes of the various wheels of a vehicle are sequentially applied in accordance with a predetermined pattern upon depression of the brake pedal.

Yet another object of this invention is to provide an anti-skid vehicle braking system wherein a constantly operating valve distributes hydraulic fluid under pressure to the brakes of a vehicle in accordance with a predetermined program upon operation of a brake pedal or other control element.

Other and further objects and advantages of the present invention will be apparent from the following description when taken in connection with the accompanying drawings wherein:

Fig. 1 is a somewhat schematic top view of the chassis of an automobile to which the principles of my invention may be applied;

Fig. 2 is a schematic diagram of a hydraulic system constructed in accordance with the principles of my invention showing the parts when the brakes are off;

Fig. 3 is a similar view of the hydraulic system with the brake pedal depressed and the front brakes on;

Fig. 4 is a fragmentary view of the hydraulic system similar to Fig. 3 with the brake pedal depressed, and with the rear brakes on; and Figs. 5–9 show the control or distributing element in various positions of operation to demonstrate the principles involved.

Referring first to Fig. 1, there will be seen the chassis 20 of an automobile including a frame 22, motor and transmission 24, front wheels 26 and associated brakes 28, rear wheels 30 and associated brakes 32, and a steering wheel 34. The brakes 28 and 32 are indicated only by block diagrams in a manner such as the brake housing might appear physically, and it will be understood that these brakes preferably are hydraulic brakes of conventional construction, but may be of any suitable or known construction. The brake pedal is indicated at 36, and a hydraulic brake fluid supply and pump unit 38 is indicated on the side of the engine. It will be understood that this unit is shown diagrammatically and can be mounted in the position shown, or any other suitable position, or that the unit can be constructed with the component parts thereof physically displaced from one another and mounted at any suitable positions in the vehicle. The hydraulic lines have been omitted from Fig. 1 for clarity of illustration, and it will be appreciated that they would be located in any convenient position which would vary in accordance with the construction of the vehicle.

A somewhat schematic diagram of the hydraulic circuit is shown in Fig. 2 with the brakes off. The hydraulic unit 38 will be seen to comprise a reservoir 40 containing hydraulic fluid 42. The reservoir is provided with a filler cap or plug 44 which is threaded into a suitable opening in the top of the reservoir, and the plug 44 preferably is provided with a vent 46 for maintaining atmospheric pressure in the reservoir.

An outlet hydraulic line 48 leads from the reservoir near the bottom thereof to a pump 50 which preferably is of the gear type. The pump preferably is driven from the motor by any apt means (not shown) and it will be understood that the pump conveniently could be driven by an extra gear on the cam shaft meshing with a gear on the power input shaft of the pump.

The outlet of the pump is connected to a hydraulic line 52 which leads to the brake control valve cylinder 54, The cylinder 54 comprises a cylindrical tube closed at both ends. It will be appreciated that one or both of the ends of the cylinder 54 would be removable, but that is a structural matter that need not be considered at the moment. A spool or valve control member 58 is axially slidable in the cylinder and comprises two end portions 60 slidably sealed against the side walls of the cylinder. The end portions 60 are interconnected by a valve core 62 of reduced diameter. The spool 58 is biased to the right as viewed in Figs. 2 and 3 by a coil spring 63 trapped within the cylinder and bearing against the left end of the spool. A valve stem 65 extends through the end of the cylinder opposite the spring 63. The brake pedal 36 is illustrated as mounted on this rod, and it will be understood that the cylinder is mounted directly beneath the floor boards of the automobile or other vehicle. It will be understood that the cylinder 54 could be incorporated in the hydraulic unit 38 in which case the brake pedal would be connected to it by any suitable means including mechanical, hydraulic, or electrical.

The hydraulic line 52 previously mentioned enters the side of the cylinder 54 generally adjacent the center thereof. A return line 64 leads from the cylinder back to the reservoir 40, and extends through the cylinder wall more-or-less to the bottom thereof. When the spool 58 is in the position shown in Fig. 2, the high pressure or hydraulic line 52 is connected to the return line 64 through the cylinder 54. A by-pass line 67 extends between the opposite ends of the cylinder 54 and is in communication with the return line 64 so that when the spool is moved from one part to another of the cylinder, no substantial resistance to movement will be offered by hydraulic fluid in the cylinder.

A high pressure outlet hydraulic line 66 leads from the cylinder 54 somewhat toward the left end thereof. It will be observed in Fig. 2 that when the brakes are off the high pressure outlet line 66 lies to the left of the spool 62 and is in communication with the by-pass line 67, and hence with the return line 64. When the brake pedal is depressed to shift the spool to the left as seen in Fig. 3, the high pressure outlet line 66 is in direct communication with the high pressure hydraulic line 52 through the space about the restricted core 62 of the spool.

The high pressure outlet line 66 is connected to forked or bifurcated branch lines 68 and 70, and these branch lines are connected at spaced apart points to a hydraulic distributor 72. The hydraulic distributor comprises a cylindrical casing 74 through which the branch lines 68 and 70 lead, and also a rotor 76. The rotor is continuously driven by the motor or engine 24 when the same is running, and to this end may be coupled to or with the input shaft of the gear pump 50. It will be appreciated hereinafter that my braking system would not fail in operation, if the engine 24 were to die with resulting stopping of pump 50 and the rotor 76. Preferably an electric motor 78 (Fig. 1) is mounted on the outside of the hydraulic unit 38 and suitable connections are made to the automobile battery to start the motor 78 if the engine 24 should die. It will be understood that in this instance the pump 50 and the rotor 76 would be driven from the engine 24 through a suitable form of clutch, as disclosed, for example, in the patent to Macdonald No. 1,167,509, issued January 1, 1916, so that the rotor would be free to turn when driven by the electric motor 78. A similar type of clutch might also be incorporated between the pump and the rotor on the one hand and the electric motor on the other so that the electric motor would not be driven by the pump or the rotor.

Two high pressure hydraulic lines 80 and 82 lead to the front and the rear brakes 28 and 32 respectively, and a return line 84 leads from the interior of the distributor casing 74 back to the reservoir 40. The rotor 76 is provided with a pair of diametrically opposite, radially extending vanes 86. These vanes rotatably seal against the inside of the casing 74, and are of sufficient width to close off any of the inlets or outlets of the lines 68, 70, 80, 82 or 84 as hereinafter will be brought out.

As previously noted, the parts are shown in Fig. 2 when the brakes are off. The spool 58 and pedal 36 are held at their extreme rightmost position by the spring 63 and a suitable stop 88 may be provided on the piston rod 65 to limit this rightmost position. The high pressure hydraulic line 52 is connected to the return line 64 as previously noted. When the brake pedal is engaged and depressed, it and the spool 58 are shifted to the left to the position shown in Fig. 3, thus connecting the high pressure line 52 with the high pressure outlet line 66. With the rotor 76 positioned as shown in Fig. 3 both of the branch lines 68 and 70 communicate with the space between the case and rotor, and through this space with the high pressure line 80 leading to the front brakes. The front brakes thus are applied. The vanes 86 block the high pressure lines 68 and 70 and also the brake line 80 from the rear brake line 82 and also from the return line 84. It will be observed that the brake line 82 is in communication with the return line 84 through the space between the casing and the rotor. The rear brakes thus are completely released. When the rotor moves to the position shown in Fig. 4 it will be observed that both of the high pressure branch lines 68 and 70 are in communication with the rear brake line 82, thus to apply the rear brakes. At the same time, the front brake line 80 is in communication with the return line 84 to release the front brakes.

Various positions of operation are shown in Figs. 5–9. In these figures, as in the previous figures, arrows are positioned adjacent the hydraulic lines to show the direction of fluid pressure. Rotation of the rotor will be assumed to be in a clockwise direction throughout all of the figures of the drawings. With the rotor in the position shown in Fig. 5, hydraulic fluid from the line 66 will enter the distributor 72 through both of the branch lines 68 and 70. The branch lines will be observed to lie on opposite sides of one of the vanes 86. The other vane 86 closes off the return line 84, and accordingly both the front and the rear brakes are subjected to the dynamic pressure of the hydraulic fluid and the front and rear brakes are applied. An instant later the vane 86 closes off the high pressure branch line 70 as shown in Fig. 9. The dynamic hydraulic pressure remains on the front brake line 80 to maintain the front brakes on while the rear brake line 82 is subjected to static pressure to hold the rear brakes on. Another instant later, as shown in Fig. 6, the vane 86 uncovers the outlet line 84 to place the rear brake line 82 in communication with the return line 84. Accordingly, the rear brakes are released while the front brakes remain on under the dynamic hydraulic pressure.

Shortly thereafter and upon continued rotation of the rotor, the upper vane 86 clears the rear brake line 82 as shown in Fig. 7 and lies between the rear brake line and the return line 84. Accordingly, dynamic hydraulic pressure is reapplied to the rear brakes and remains on the front brakes, all of the brakes thereby being applied. A short time thereafter continued rotation of the rotor causes one of the vanes 86 to pass the front brake line 80 (not shown) to interconnect the front brake line with the return line for releasing the front brakes. Just before that vane passes the inlet branch line 68 (Fig. 8) the opposite vane 86 covers the return line 84 so that the high pressure line 66 is never in direct communication with the return line 84.

It will be observed that in each instance when one of the vanes first closes off a brake line that has been subject to dynamic hydraulic pressure, static pressure remains on this line. In accordance with the specific distributor construction herein shown and described it will be observed that the front brakes are on for approximately ⅔ of the time and are off for approximately ⅓ of the time. Similarly, the rear brakes are on approximately ⅔ of the time, and are off approximately ⅓ of the time. The on periods of the front and rear brakes overlap one another in certain instances so that the front brakes alone are on for one third of the time, the rear brakes alone are on for ⅓ of the time, and the front and rear brakes are on simultaneously for ⅓ of the time. At no time are both the front and rear brakes off. It therefore should be appreciated that should the motor fail in absence of the electric motor after the brakes have been applied, the distributor will stop at the same time as the pump and one of the sets of front or rear brakes will remain on constantly to halt the vehicle.

The brakes could be arranged to act simultaneously by connecting all of the brakes to either the front or rear brake lines, and by sealing off the other brake line. Other expedients could be adopted for intermittently operating the brakes in unison, and other distributor structures could be utilized to operate the brake sequentially in any timed relation in pairs as previously suggested, or individually. It is contemplated that entirely different types of distributors could be used and that the structure in general could vary from that shown and described by way of illustration.

It will be understood that the invention includes all that which falls within the spirit and scope of the appended claims.

I claim:

1. An anti-skid braking system for a vehicle having front and rear brake means, and comprising a source of braking power, distributor means having separate connections with said front and rear brake means, means for supplying braking power from said source to said distributor means, said distributor means including control means for sequentially controlling said separate connections to effect alternate application and release of the front and rear brake means with interim substantially simultaneous application of both front and rear brake means, and means for operating said distributor means to supply braking power from the distributor means through said connections to the brake means in accordance with the movement of said control means relative to the separate connections in the sequential control of said connections.

2. An anti-skid braking system as claimed in claim 1, wherein the distributor means includes a cylindrical casing connected to said separate connections, and wherein the control means comprises a rotor disposed within said casing and forming therewith an annular chamber receiving braking power from said source.

3. An anti-skid braking system as claimed in claim 2, wherein said rotor is provided with radial vanes sub-dividing the annular chamber whereby to selectively afford communication between certain of said connections and a sub-division of said chamber in accordance with rotation of the rotor relative to said connections.

4. An anti-skid braking system as claimed in claim 3, wherein said vanes are of sufficient arcuate extent to momentarily close off each connection as the vanes pass thereby.

5. An anti-skid braking system as claimed in claim 1, wherein the source of braking power comprises a hydraulic fluid reservoir and pump means, and wherein the means supplying braking power to the distributor means comprises valve means operable in one position to direct the hydraulic fluid from the pump means to the distributor means and in another position to by-pass the distributor means and return the hydraulic fluid to the reservoir.

6. An anti-skid braking system as claimed in claim 1, wherein the source of braking power comprises a hydraulic fluid reservoir and pump means, and wherein the distributor means includes a casing connected to said separate connections, said casing having an inlet connection adapted for communication with said pump means and an outlet connection to said reservoir, and wherein the distributor control means at all times prevents direct communication between the inlet connection and the outlet connection.

7. An anti-skid braking system as claimed in claim 6, wherein the inlet connection comprises a pair of branch inlets and wherein the distributor control means comprises a rotor within the casing and forming therewith an annular chamber receiving the hydraulic fluid from said inlet branches, said rotor having spaced vanes extending radially outwardly and sub-dividing the annular chamber, the arcuate extent of the vanes being such as to cover only one inlet branch at a time as the rotor rotates within the casing.

8. An anti-skid braking system as claimed in claim 7, wherein the means supplying braking power to the distributor means comprises valve means operable in applying the brake means to direct hydraulic fluid from the pump means to the inlet branches and operable in releasing the brake means to direct the hydraulic fluid from the pump means to the reservoir.

References Cited in the file of this patent

UNITED STATES PATENTS

| 1,167,509 | Macdonald | Jan. 11, 1916 |
| 1,650,338 | Fornaca | Nov. 22, 1927 |
| 1,875,003 | Horn | Aug. 30, 1932 |
| 2,273,171 | Bennett | Feb. 17, 1942 |
| 2,466,837 | Bohr | Apr. 12, 1949 |
| 2,660,266 | Maloney | Nov. 24, 1953 |

FOREIGN PATENTS

| 676,680 | Great Britain | July 30, 1952 |